(12) United States Patent
Lu et al.

(10) Patent No.: US 12,146,993 B2
(45) Date of Patent: Nov. 19, 2024

(54) WAVEFRONT CORRECTION FOR BEAM SHAPING

(71) Applicant: Beijing Voyager Technology Co., Ltd., Beijing (CN)

(72) Inventors: Yue Lu, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 1002 days.

(21) Appl. No.: 17/131,554

(22) Filed: Dec. 22, 2020

(65) Prior Publication Data

US 2022/0196811 A1 Jun. 23, 2022

(51) Int. Cl.
*G01S 7/497* (2006.01)
*G01S 7/481* (2006.01)
*G01S 7/4863* (2020.01)
*G01S 17/931* (2020.01)

(52) U.S. Cl.
CPC ............ *G01S 7/497* (2013.01); *G01S 7/4816* (2013.01); *G01S 7/4817* (2013.01); *G01S 7/4863* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,617,060 B1* | 11/2009 | Rauch | G01J 9/00 356/124.5 |
| 2006/0008274 A1* | 1/2006 | Wilcken | H01Q 3/2676 398/115 |
| 2006/0285192 A1* | 12/2006 | Yang | G02B 26/0841 359/291 |
| 2009/0046372 A1 | 2/2009 | Maram et al. | |
| 2011/0103410 A1 | 5/2011 | Hutchin | |
| 2013/0015367 A1 | 1/2013 | Cui | |
| 2013/0176167 A1 | 7/2013 | Bergeron et al. | |
| 2018/0042476 A1 | 2/2018 | Nozato | |
| 2018/0059413 A1 | 3/2018 | Banyay et al. | |
| 2019/0173587 A1 | 6/2019 | Hendrickson et al. | |

\* cited by examiner

*Primary Examiner* — Luke D Ratcliffe
(74) *Attorney, Agent, or Firm* — Kilpatrick Townsend & Stockton LLP

(57) ABSTRACT

An apparatus for detecting an incoming laser beam with a photodetector is described. A beam splitter is mounted to receive the incoming laser beam after correction by a wavefront corrector. The beam splitter directs most of the incoming laser beam to the photodetector, but diverts a small portion of the incoming laser beam to a wavefront sensor. A feedback control circuit is configured to control the wavefront corrector to at least partially correct for wavefront distortions detected by the wavefront sensor.

13 Claims, 10 Drawing Sheets

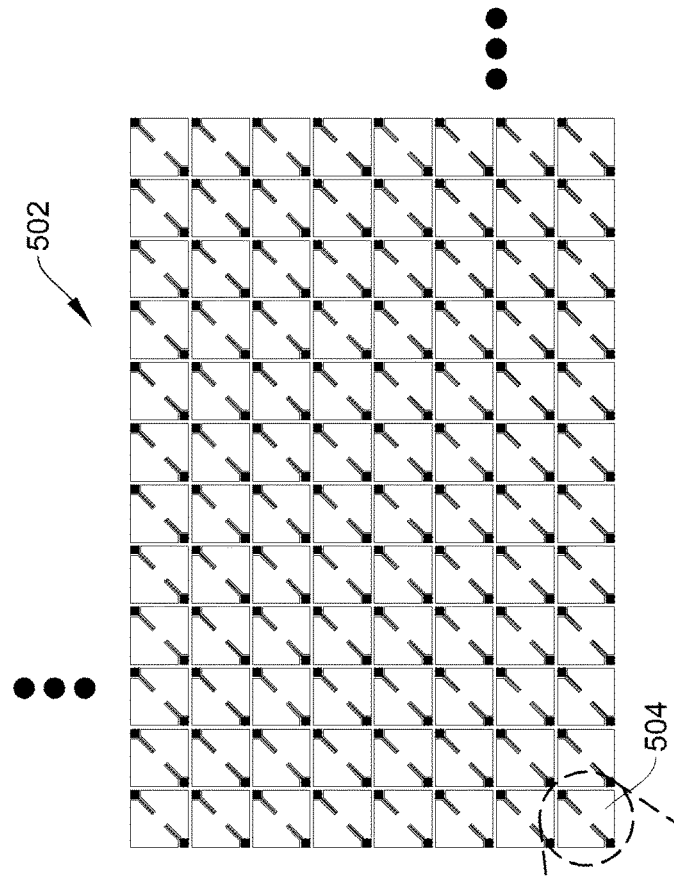
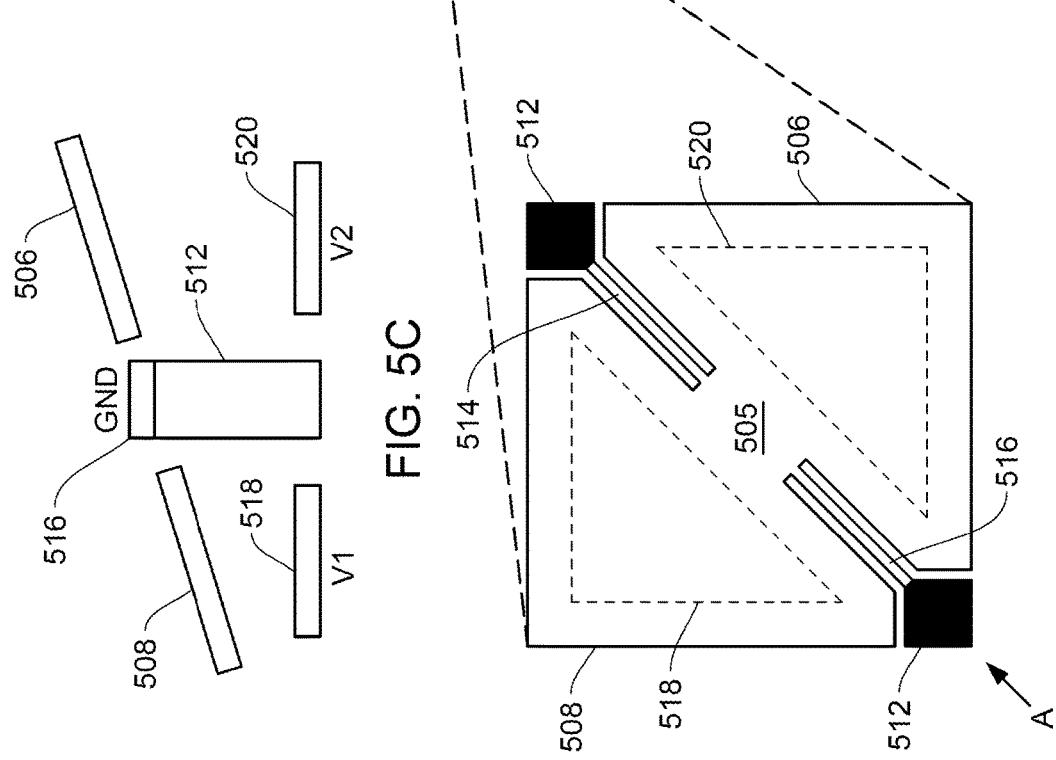
FIG. 5A
FIG. 5B
FIG. 5C

WAVEFRONT CORRECTION FOR BEAM SHAPING

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc., and can be configured to perform both transmission and reception of light. For example, a light steering transmitter may include a micro-mirror to control the projection direction of light to detect/image an object. Moreover, a light steering receiver may also include a micro-mirror to select a direction of incident light to be detected by the receiver, to avoid detecting other unwanted signals. A micro-mirror assembly typically includes a micro-mirror and an actuator. In a micro-mirror assembly, a mirror-mirror can be connected to a substrate via a connection structure (e.g., a torsion bar, a spring, etc.) to form a pivot point. One such type of micro-mirror assembly can be a micro-electro-mechanical system (MEMS)-type structure that may be used for a light detection and ranging (LiDAR) system in an autonomous vehicle, which can be configured for detecting objections and determining their corresponding distances from the vehicle. LiDAR systems typically work by illuminating a target with an optical pulse and measuring the characteristics of the reflected return signal. The return signal is typically captured as a point cloud. The width of the optical-pulse often ranges from a few nanoseconds to several microseconds.

In a scanning flash LiDAR system, the optical beam received back from the object is typically distorted for various reasons. For example, the initial divergence from the laser source adds to the beam, causing it to be mis-collimated. Air density non-uniformity along the optical path also adds to the wavefront non-uniformity. Receiving lens aberrations add to the distortion of the optical beam spot focused on the focal plane. All of these beam distortions increase the effective optical spot size on the focal plane of the detector, causing the focused beam to be more spread out across the focal plane, therefore reducing the effective optical intensity per unit area.

Various optics are used to process the light at different points, such as collimating a transmitted beam and focusing a received beam. These optics can introduce wavefront distortions, in particular around the edges. The wavefront can also be distorted by other environmental factors. Such distortions introduce noise in the system, making it more difficult to distinguish the received pulse from surrounding noise, and thus making the detection of objects by LiDAR more difficult.

Wavefront distortion is a problem that has been addressed in other fields, such as in telescopes and microscopes. Adaptive optics is a technology used to reduce incoming wavefront distortions by deforming a mirror in order to compensate for the distortion. It is used in telescopes, laser communication systems, microscopy, optical fabrication and retinal imaging. Adaptive optics measures the distortions in a wavefront at the image detector and compensates for them with a device such as a deformable mirror or a liquid crystal.

BRIEF SUMMARY OF THE INVENTION

Techniques disclosed herein relate generally to apparatus and methods for correcting for wavefront distortions by diverting a portion of a received beam to a wavefront detector, and using detected distortions to control a wavefront corrector in the incoming beam path. More specifically, and without limitation, disclosed herein are microelectromechanical (MEMS) mirror arrays for wavefront correction that can be used in, for example, light detection and ranging (LiDAR) systems or other light beam steering systems.

In certain embodiments, an apparatus for detecting an incoming laser beam with a photodetector is described. A beam splitter is mounted to receive the incoming laser beam after correction by a wavefront corrector. The beam splitter directs most of the incoming laser beam to the photodetector, but diverts a small portion of the incoming laser beam to a wavefront sensor. A feedback control circuit is configured to control the wavefront corrector to at least partially correct for wavefront distortions detected by the wavefront sensor.

In certain embodiments, the beam splitter diverts less than five percent of the incoming laser beam. By using this diversion, instead of the primary photodetector as in prior art wavefront distortion systems, a different type of photodetector may be used—one that is essentially digital, with many pixels.

In some embodiments, the wavefront sensor has an array of pixels, and the wavefront corrector has an array of MEMS micro mirrors corresponding to the array of pixels. Each pixel in the wavefront sensor has its own array of photodetectors. In embodiments, the array of pixels is 100,000—one million pixels, which correspond to the array of MEMS micro mirrors which is also 100,000—one million micro mirrors. Each pixel in the wavefront sensor has its own array of photodetectors, of at least 9 photodetectors.

In some embodiments, each MEMS micro mirror is an electrostatic force micro mirror with a mirror body and at least two electrodes below a mirror body. An electrostatic force micro mirror is a design which maximizes the mirror area and minimizes supporting structure. This allows reflecting, at the desired tilt angle, most of the light hitting that mirror, which is considered a single pixel. With a large number of pixels, only a slight tilt, and thus a slight amount of electrostatic force, need be applied, minimizing the power requirement.

In one embodiment, the electrostatic MEMS micro mirror has a pair of anchors at diagonal corners that are connected, via a spring, to the mirror body, enabling one directional wavefront correction along a first diagonal axis. For a micro tilting mirror with the same area size, a diagonal axis based tilting mirror has a smaller moment of inertia since more of the mirror mass is closer to the axis than for a perpendicular axis. The smaller moment of inertia makes the mirror more stable and easier to be actuated. The two electrodes are connected to first and second control voltage sources, and the mirror body is connected to ground. The voltage sources are controlled to activate one or the other, to tilt the mirror body with electrostatic force generated by the voltage difference between the electrode and the mirror body In other embodiments, each mirror tilts along two axes to enable two directional wavefront correction along a first and a second axis. However, a single axis correction may be sufficient to condense a received laser beam wavefront that has been spread out.

In some embodiments, a method for detecting an incoming laser beam with a photodetector is disclosed. The method includes directing most of the incoming laser beam to the photodetector, and diverting a portion of the incoming laser beam. The method also includes receiving the diverted portion of the incoming laser beam at a wavefront sensor, and detecting wavefront distortions of the incoming laser beam with the wavefront sensor. Finally, the method includes modifying the incoming laser beam to at least partially correct for the wavefront distortions detected by the wavefront sensor.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which:

FIGS. 5A-5C are diagrams of a single axis electrostatic mirror array, according to certain embodiments;

DETAILED DESCRIPTION OF THE INVENTION

Figure 1:
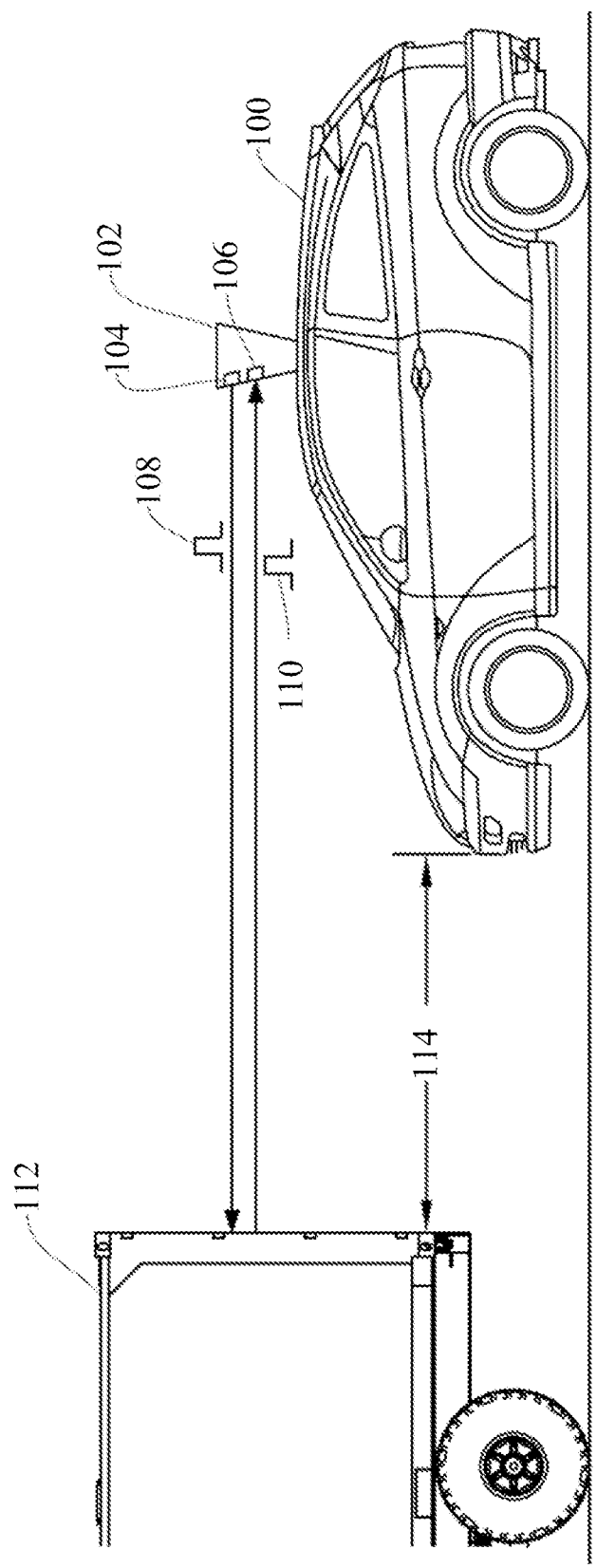
FIG. 1 shows an autonomous vehicle with a LiDAR system, according to certain embodiments.

Aspects of the present disclosure relate generally to correcting for wavefront distortions, and more particularly to LiDAR systems, according to certain embodiments.

In the following description, various examples of a wavefront correction feedback system and MEMS-based micro mirror structures and are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to correcting for wavefront distortions by diverting a portion of a received beam to a wavefront detector, and using detected distortions to control a wavefront corrector in the incoming beam path.

As discussed in further detail below, an apparatus for detecting an incoming laser beam 402 with a photodetector 410 is described. A beam splitter 406 is mounted to receive the incoming laser beam after correction by a wavefront corrector 404. The beam splitter directs most of the incoming laser beam to the photodetector, but diverts a small portion (e.g., less than 5%) of the incoming laser beam to a wavefront sensor 412. In embodiments, the wavefront corrector has an array 502 of MEMS micro mirrors that create an array of pixels. The wavefront detector detects the position of the incoming beam at each pixel position. Each pixel position has its own array of photodetectors. In embodiments, the array of pixels is at least 100,000—one million pixels, which correspond to the array of MEMS micro mirrors which is also at least 100,000—one million micro mirrors. The wavefront sensor has a large array of pixels 600. Each pixel in the wavefront sensor has its own array of photodetectors, of at least 9 photodetectors. Thus, there are at least 900,000—nine million individual photodetectors. A feedback control circuit is configured to control the wavefront corrector to at least partially correct for wavefront distortions detected by the wavefront sensor by controlling the tilt of the micro mirror at each pixel position.

The distortions corrected typically include lower intensities of the wavefront near the edges, due to the effects of lenses in the LiDAR system. Also, the received beam may be spread out, ending up being larger than the receiving aperture, and thus some of the signal is lost due to being outside the aperture. The wavefront correction can redirect these outlying pixels more toward the center, resulting in a more concentrated wavefront, as well as an even wavefront, that will fit in the receiver aperture. Since most pixels will typically not need to be corrected, only a portion of the micro mirror array needs control signals at any given time, simplifying the amount of control needed. The default position of each micro mirror, with no voltage applied, is to reflect without any tilt.

Typical Lidar System Environment for Certain Embodiments of the Invention

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
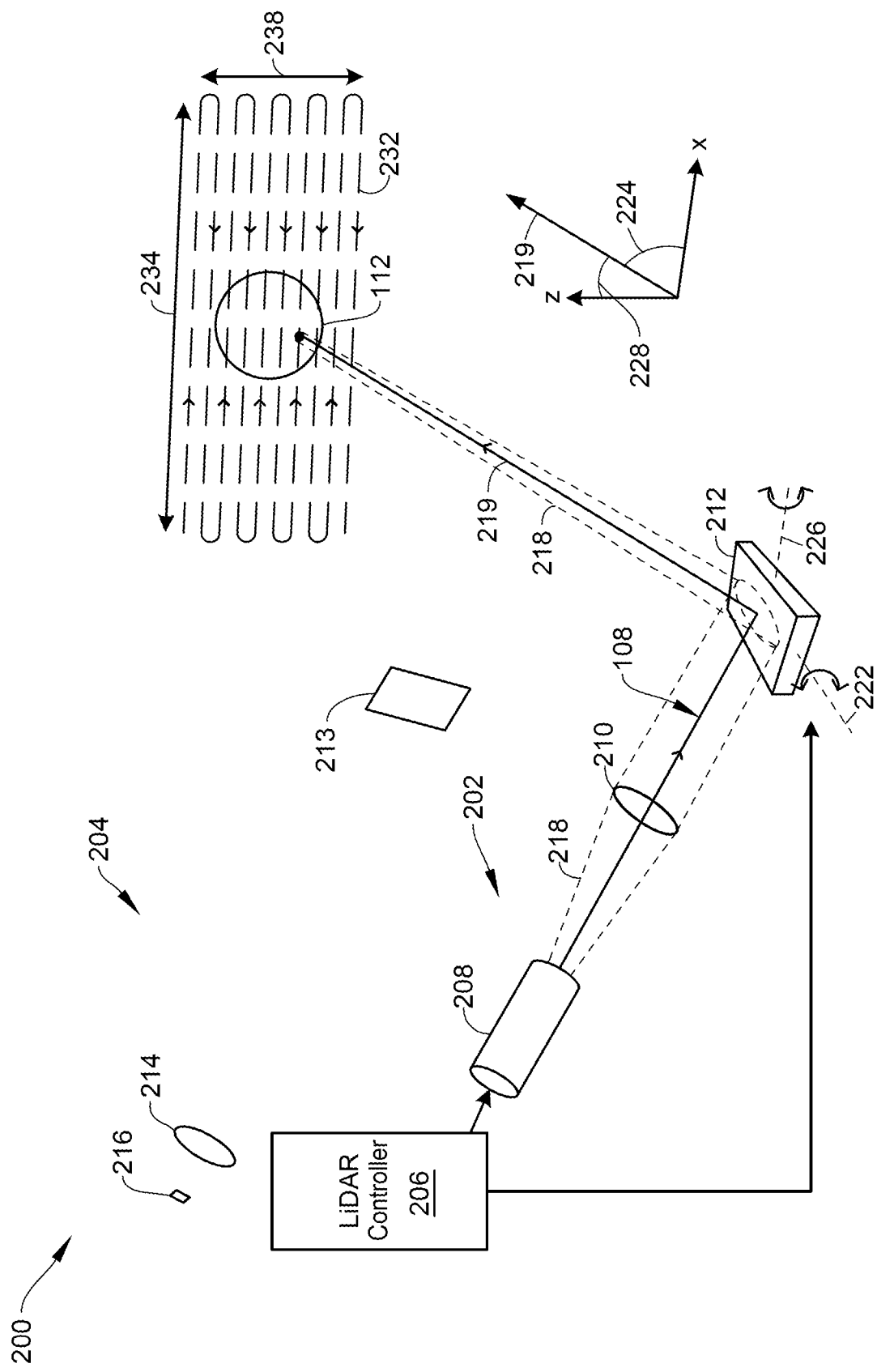
FIG. 2A shows an example of a light projection operation, according to certain embodiments.
Figure 2B:
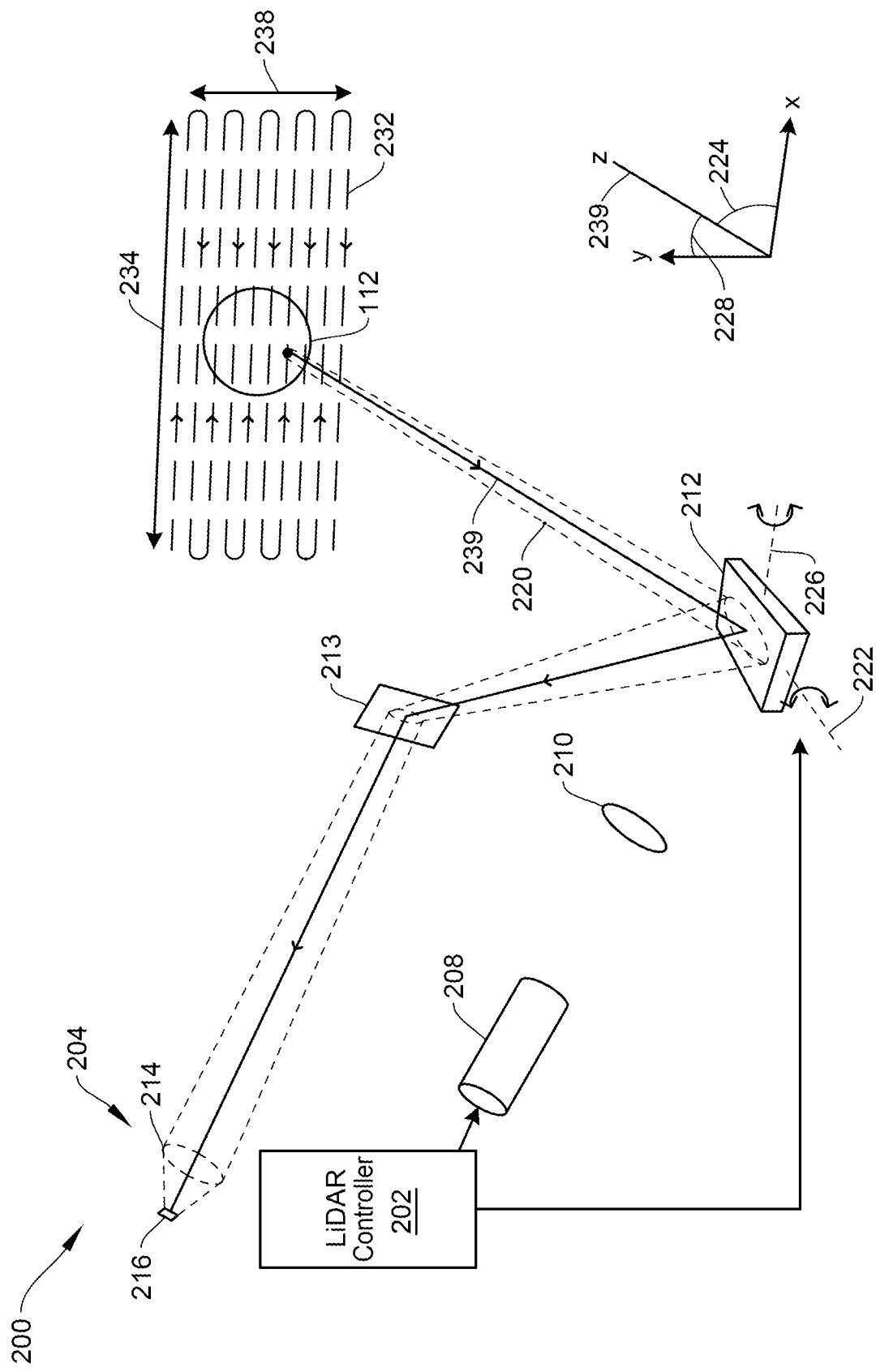
FIG. 2B shows an example of a light detection operation, according to certain embodiments.

FIGS. 2A and FIG. 2B illustrate simplified block diagrams of an example of a LiDAR module 200 according to certain embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a light projection operation, according to certain embodiments. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204 and detected by the LiDAR module, as further described below with respect to FIG. 2B. In certain embodiments, mirror assembly 212 can include one or more comb spines with comb electrodes (see, e.g., FIG. 3), as will be described in further detail below.

FIG. 2B shows an example of a light detection operation, according to certain embodiments. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

Wavefront Correction

Figure 3:
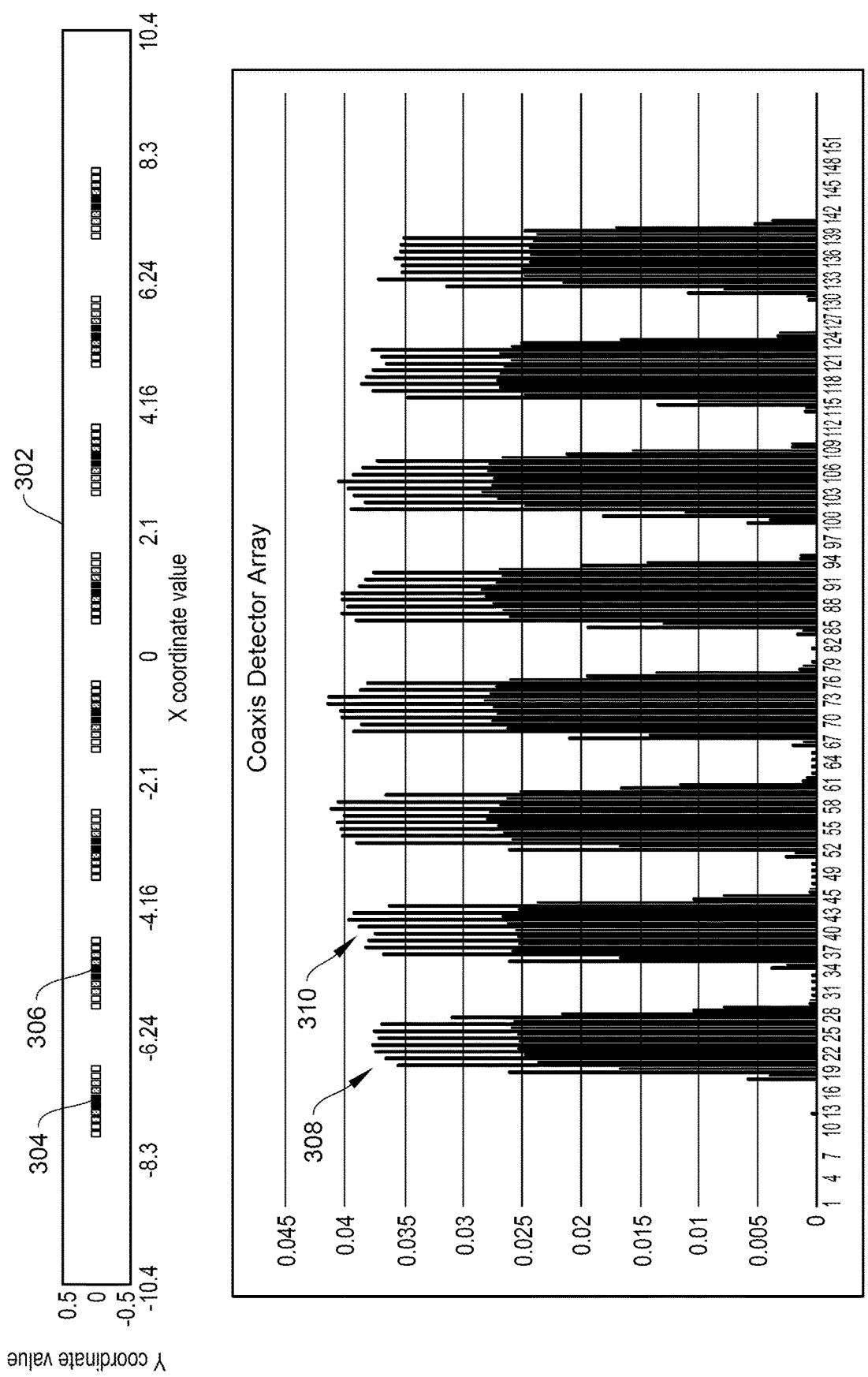
FIG. 3 is a diagram illustrating the non-uniform intensity distribution of an incoming laser beam on a detector plane.

FIG. 3 is a diagram illustrating the non-uniform intensity distribution of an incoming laser beam on a detector plane. An eight element linear detector 302 is illustrated, with eight elements 304, 306, etc. Each element has multiple detectors. Below linear detector 302 is a graph of the intensity of light detected at each detector. As can be seen, there are groupings of pixel intensities, with grouping 308 corresponding to element 304, grouping 310 corresponding to element 306, etc. The higher, lightly shaded intensities in grouping 308 show the intensities detected by individual photodetectors in element 304 for a system with a single receiving focusing lens. As can be seen, due to wavefront distortions, the intensities near the edges are lower. The 8 elements pick up a single laser beam pulse across all 8 elements. The darker shaded, lower intensities in grouping 308 show the intensities detected by individual photodetectors in element 304 for a system with multiple receiving focusing lenses that partially correct for wavefront aberrations. The multiple lens system is more complex and more expensive, and yet still does not completely correct the wavefront distortion, as can be seen. In addition, the multiple lenses reduce the intensity of the incoming light beam. A multiple lens system cannot correct the wavefront "adaptively", as the wavefront can change over time, over different objects. Embodiments of the invention described below address the distortion not corrected by the single lens system, but could also be used with a more complex, multiple lens system.

Figure 4:
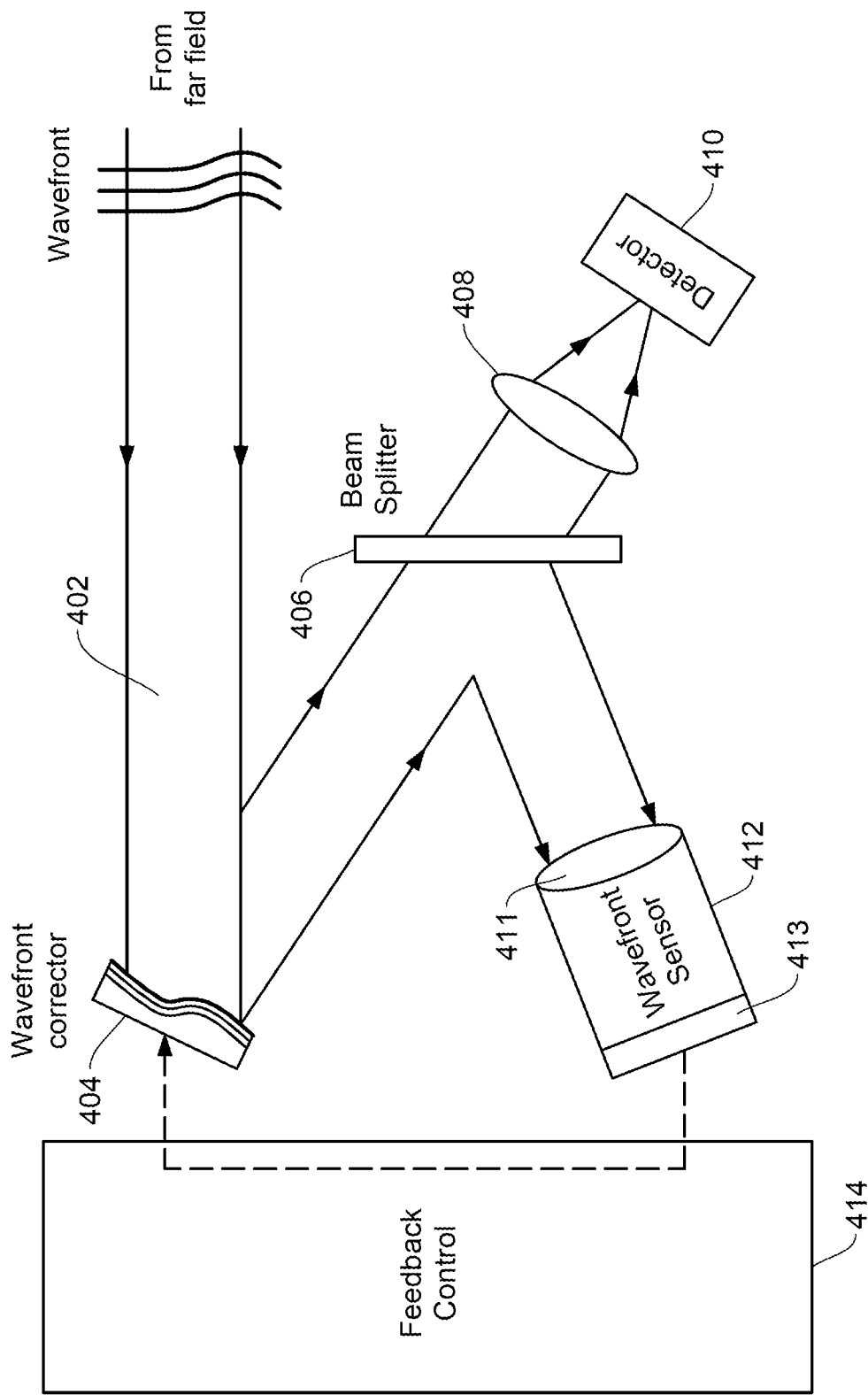
FIG. 4 is a diagram of a system for correcting for wavefront distortions using a beam splitter, wavefront detector, and wavefront corrector, according to certain embodiments.

FIG. 4 is a diagram of a system for correcting for wavefront distortions using a beam splitter, wavefront detector, and wavefront corrector, according to certain embodiments. An incoming laser beam 402 has been reflected off an object in the environment. Laser beam 402 is redirected by wavefront corrector 404, with corrections, to a beam splitter 406. Most (e.g., 95% or more) of the redirected laser beam passes through beam splitter 406 to a lens 408 which focuses the light on a detector 410 (e.g., the linear detector 302 of FIG. 3). Although this system will not compensate for distortions by lens 408, the majority of the distortion is from the far field and the laser, not from the lens 408.

Beam splitter 406 redirects a portion (e.g., less than 5%) of the incoming beam to a wavefront sensor 412. Distortions and divergence in the wavefront of the incoming beam are detected by wavefront sensor 412, and provided to a feedback control system 414. In one embodiment, a large array (e.g., 900,000-9 million) of tiny photodetectors in wavefront sensor 412 detect the intensity at different pixel positions. Feedback control system 414 processes the detected intensities, and provides correction signals to corresponding pixel positions in wavefront corrector 404.

Figure 6:
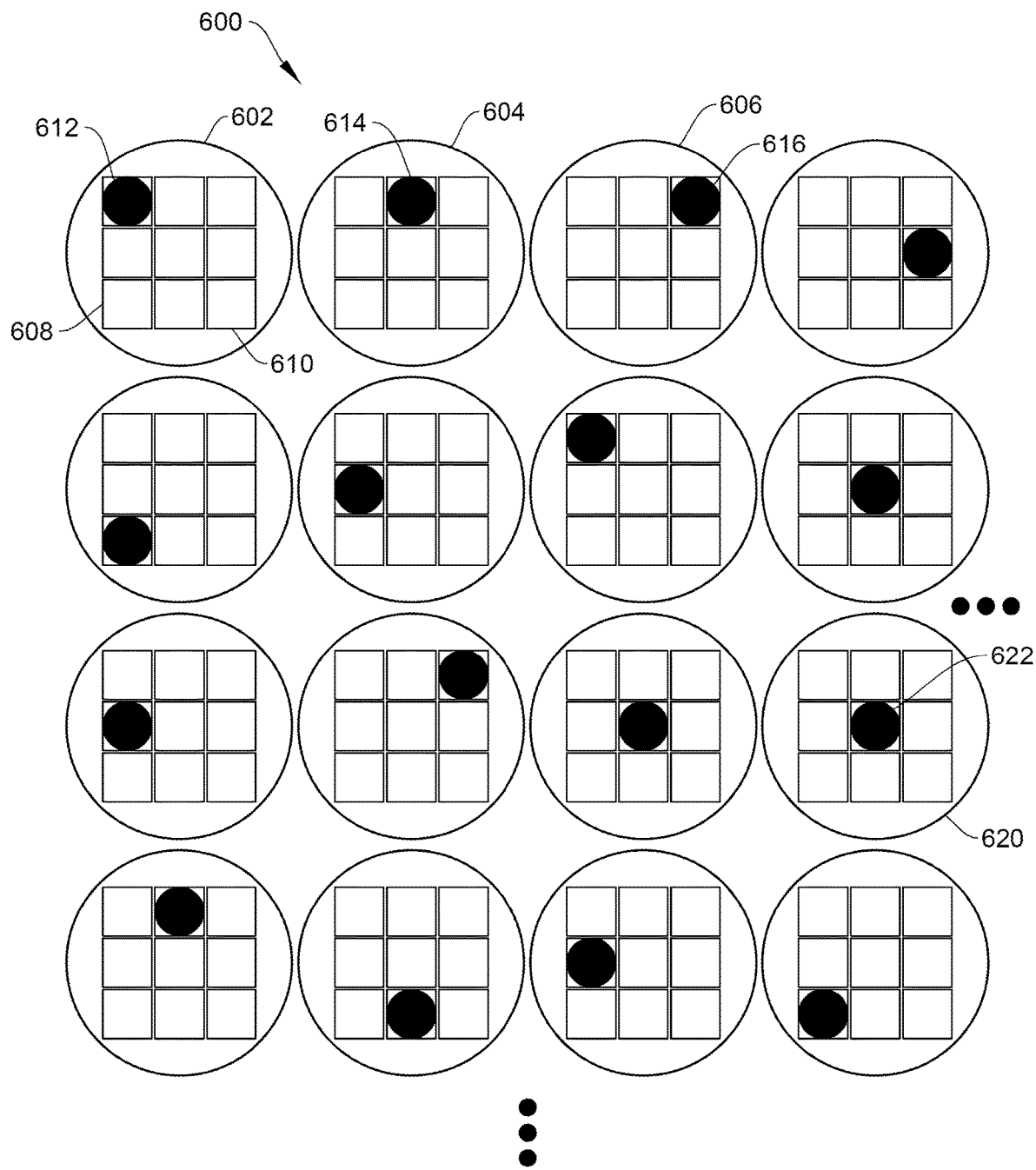
FIG. 6 is a diagram illustrating an array of wavefront detector pixels, each pixel with a detector array, according to certain embodiments.

In one embodiment, wavefront sensor 412 includes a micro lens array 411 focused on a CMOS sensor array 413. The micro lens array is a large array (e.g., 100,000-1 million lenses). Each micro lens focuses a pixel on a pixel in the CMOS sensor array, with a pixel in the CMOS sensor array having at least 9 photodetectors, as illustrated in FIG. 6. If instead a large focusing lens was used, that would introduce additional distortion of the wavefront in the feedback path. By attempting to correct for that additional distortion, the wavefront would be further distorted, since the path to detector 410 does not pass through the lens. By using a large array of micro lenses instead, the additional distortion problem is avoided, allowing pixel-level distortion to be measured, as described with respect to FIG. 5 below.

In one embodiment, wavefront corrector 404 is a large array of MEMS micro-mirrors that reflect pixels of the incoming beam wavefront at slightly different angles to correct for wavefront distortions. Such a mirror array is illustrated in FIGS. 5A-C. In other embodiments, a transmissive wavefront corrector could be used. A liquid crystal based wavefront sensor, in most cases, is also reflective instead of transmissive. A large array of liquid crystal cells can be made to tune the phase change of each single element.

FIGS. 5A and 5B are diagrams of an electrostatic mirror array for wavefront corrector 404, according to certain embodiments. FIG. 5B shows a 12×8 portion 502 of a mirror array that can contain hundreds of thousands or millions of micro mirrors, such as micro mirror 504. Each micro mirror reflects a portion of an incoming laser beam, creating a pixel for each micro mirror. The micro mirrors have a design that maximizes the tiltable reflective mirror surface, and minimizes non-tilting support structures, to maximize the amount of the incoming beam that is reflected, and minimize losses.

FIG. 5B is a top-view diagram of micro mirror 504 of FIG. 5A. A mirror body 505 has two triangular halves 506 and 508. Anchors 510 and 512 connect to the mirror body 505 through springs 514 and 516, respectively. In one embodiment, springs 514 and 516 are simply narrow portions of the mirror body, with gaps cut out between each spring and the mirror body to allow rotation around the spring. The center portion of the mirror body can tilt, with some tilt in descreasing amounts along the springs up to the anchors. Shown in phantom are the electrodes below the mirror halves, V1 electrode 518 and V2 electrode 520.

FIG. 5C is a side-view diagram of micro mirror 504 from a corner point of view A as shown in FIG. 5B. FIG. 5C shows V1 electrode 518 and V2 electrode 520 below the mirror halves 506 and 508. The mirror halves are coated with a reflective metal material that is both reflective and conductive. When V1 electrode 518 is activated by applying a positive voltage, it will attract mirror half 508 with electrostatic force, causing the mirror body to tilt as shown in FIG. 5C. The tilting is around springs 514, 516 shown in FIG. 5B, which form the axis around which tilting occurs. To tilt in the other direction, V2 electrode 520 is activated by applying a positive voltage. If zero voltage is applied, the mirror will be flat, and not tilted. Alternately, negative voltages could be applied to repel one half of the mirror, rather than attract it. In another embodiment, one electrode could have a positive voltage applied, while the other has a negative voltage applied, to attract one side and repel the other. However, by controlling only one electrode, the number of control signals at any given time is cut in half. The size of the micro mirrors can be in the range of a few microns to a few tens of microns. For example, for a one million micro mirror array, each micro mirror may have an area of 100 mm$^2$.

The mirror reflective metal material can be, for example, gold, silver, rhodium, platinum, copper or aluminum. The reflective metal films typically have a thickness of about 20 nm to about 2000 nm. The metal film is connected to ground through anchors 510 and 512. The mirror body is typically a silicon substrate. A bond layer can be added between the reflective metal film and the substrate in order to adhere the reflective metal film to the silicon substrate.

The activation of the electrodes for one million micro mirrors can be done through bus and wire architectures, with 1000×1000 control lines. The layout is similar to that used to read and write to memory locations for a memory chip. Texas Instrument's DLP is an example of this micro mirror array architecture, as well as the control circuitry.

The described electrostatic design maximizes the mirror area for each pixel, avoiding loss of signal intensity due to non-reflective, or non-tilting portions of the mirror array. Alternately, other mirror array designs could be used, such as interlocking comb electrodes which are used on more modern MEMS mirror arrays. However, such a comb design involves tradeoffs, since more of the surface area (the comb) is not reflective and/or not tilting. This tradeoff may be worth making for more precision in the tilt angle in some products.

FIGS. 5A-C thus depict a MEMS tilting mirror array for wavefront correction along one axis or direction, enabling a "pixel-by-pixel" style wavefront correction. Thus, the illustrated device is used for 1-directional wavefront correction. In an alternate embodiment, another axis degree of freedom is provided, and the device array can be used for 2-dimensional wavefront correction.

FIG. 6 is a diagram illustrating an array 600 of wavefront detector pixels, each pixel with a detector array, according to certain embodiments. Array 600 corresponds to CMOS sensor array 413 of FIG. 4. A partial array of 12 pixels is shown, which can be part of an array of 100,000-1 million pixels. The pixels in the array include pixels 602, 604, 606, etc. Each pixel contains 9 photodetectors, such as photodetectors 608 and 610 in pixel 602. The pixels are positions on the CMOS photodetector array, not physical structures. Also, the photodetectors could be closer to adjoining pixel photodetectors than shown, the diagram is for showing the concepts, and is not to scale. The number of pixels, and the number of photodetectors in each pixel, could be varied. For the sake of uniformity, there may be unused rows and columns of pixels in the horizontal and vertical spaces between pixels.

As described earlier, a separate micro lens in a micro lens array focuses the reflection from a corresponding micro mirror in the mirror array on a corresponding pixel. A pixel corresponding to a portion of the laser beam wavefront that is not distorted will be focused on the middle photodetector in a pixel's photodetector array, such as focused light 622 in pixel 620. If there is distortion, the light will hit off-center, such as the upper left 612 in pixel 602, the upper middle 614 in pixel 604 and the upper right 616 in pixel 606, etc.

The detected light position in each pixel is provided to feedback control circuitry 414 of FIG. 4, which then controls the appropriate micro mirror corresponding to the same pixel in the micro mirror array of wavefront corrector 404. The micro mirror will tilt to move the light back toward the center. The new position will be detected, and if it is still not in the center, further correction signals will be provided through feedback control circuitry 414 until the mirror obtains the optimum tilt to position the detected light on the center photodetector in each photodetector array. A photodetector array of nine photodetectors provides resolution along the four sides and four corners of the center pixel.

More resolution could be obtained with a larger array, either for the same size pixel, or a larger pixel. For example, another row of detectors could be added on all sides, for a pixel array of 25 photodetectors. Alternately, a smaller array could be used. For example, four photodetectors in a square or three in a triangle could be used, with detection of whether all are producing the same amplitude signal, which would indicate that the light is in the middle, with a quarter or third falling on each photodetector. If one photodetector has a larger amplitude than the others, this would indicate that the micro mirror needs to tilt the pixel of light away from that photodetector and toward the middle.

Figure 7:
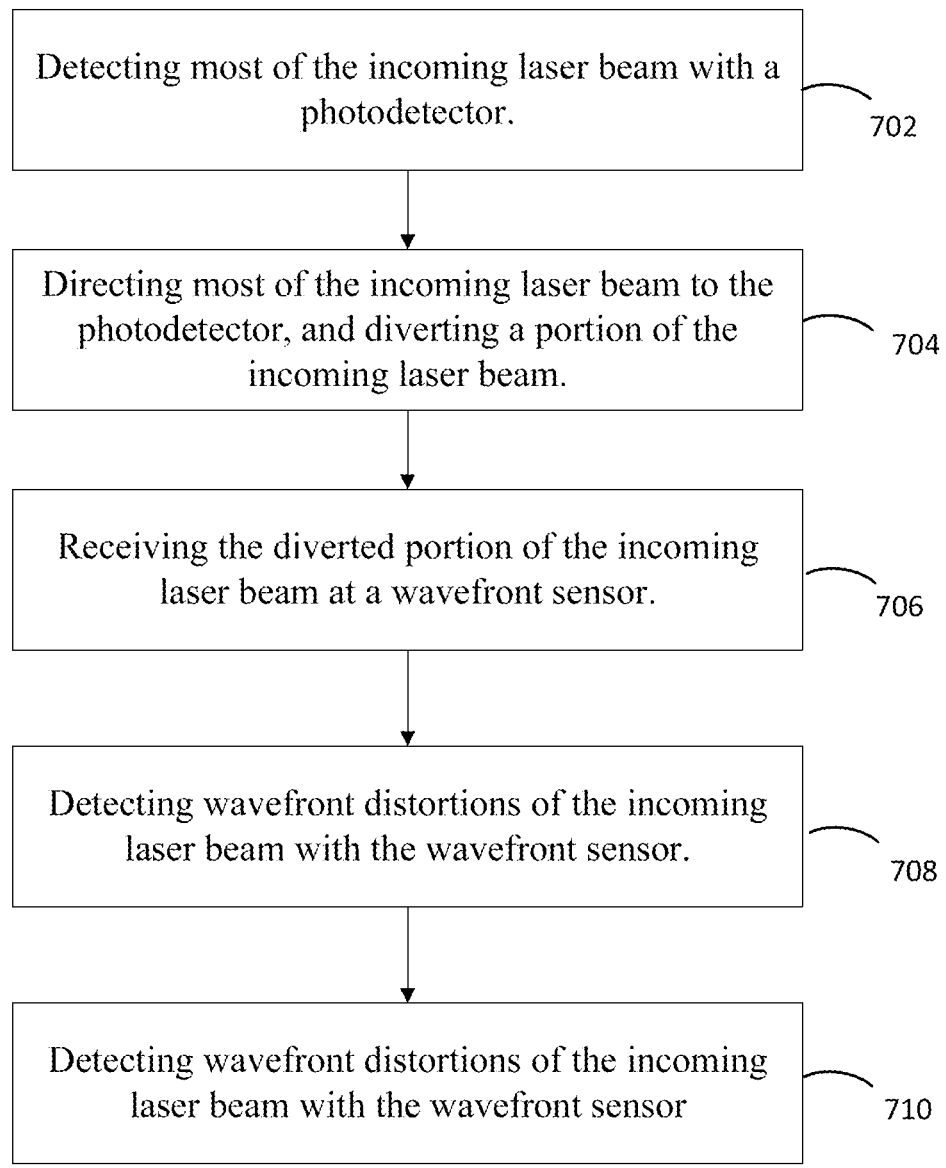
FIG. 7 is a flow chart of a method for correcting for wavefront distortions, according to certain embodiments.

FIG. 7 is a flow chart of a method for correcting for wavefront distortions, according to certain embodiments. The first step 702 is detecting most of the incoming laser beam with a photodetector. Step 704 is directing most of the incoming laser beam to the photodetector, and diverting a portion of the incoming laser beam. Step 706 is receiving the diverted portion of the incoming laser beam at a wavefront sensor. Step 708 is detecting wavefront distortions of the incoming laser beam with the wavefront sensor. Finally, step 710 is modifying the incoming laser beam to at least partially correct for the wavefront distortions detected by the wavefront sensor.

In summary, embodiments provide a micro-electromechanical system (MEMS) apparatus for detecting an incoming laser beam 402 with a photodetector 410. A beam splitter 406 is mounted to direct most of the incoming laser beam to the photodetector 402, and to divert a portion (e.g., less than 5%) of the incoming laser beam to a wavefront sensor 412 mounted to receive the portion of the incoming laser beam diverted by the beam splitter. The wavefront sensor has an array 600 of pixels, each pixel having an array of photodetectors (608, 610). A wavefront corrector 404 is mounted to direct the incoming laser beam to the beam splitter, the wavefront corrector having an array 502 of MEMS micro mirrors corresponding to the array of pixels 600. A feedback control circuit 414, coupled between the wavefront sensor and the wavefront corrector, is configured to control the wavefront corrector to at least partially correct for wavefront distortions detected by the wavefront sensor by tilting individual micro mirrors 504 to correct for a position in a corresponding pixel of a photodetector which detects the incoming laser beam.

Example LiDAR System Implementing Aspects of Embodiments Herein

Figure 8:
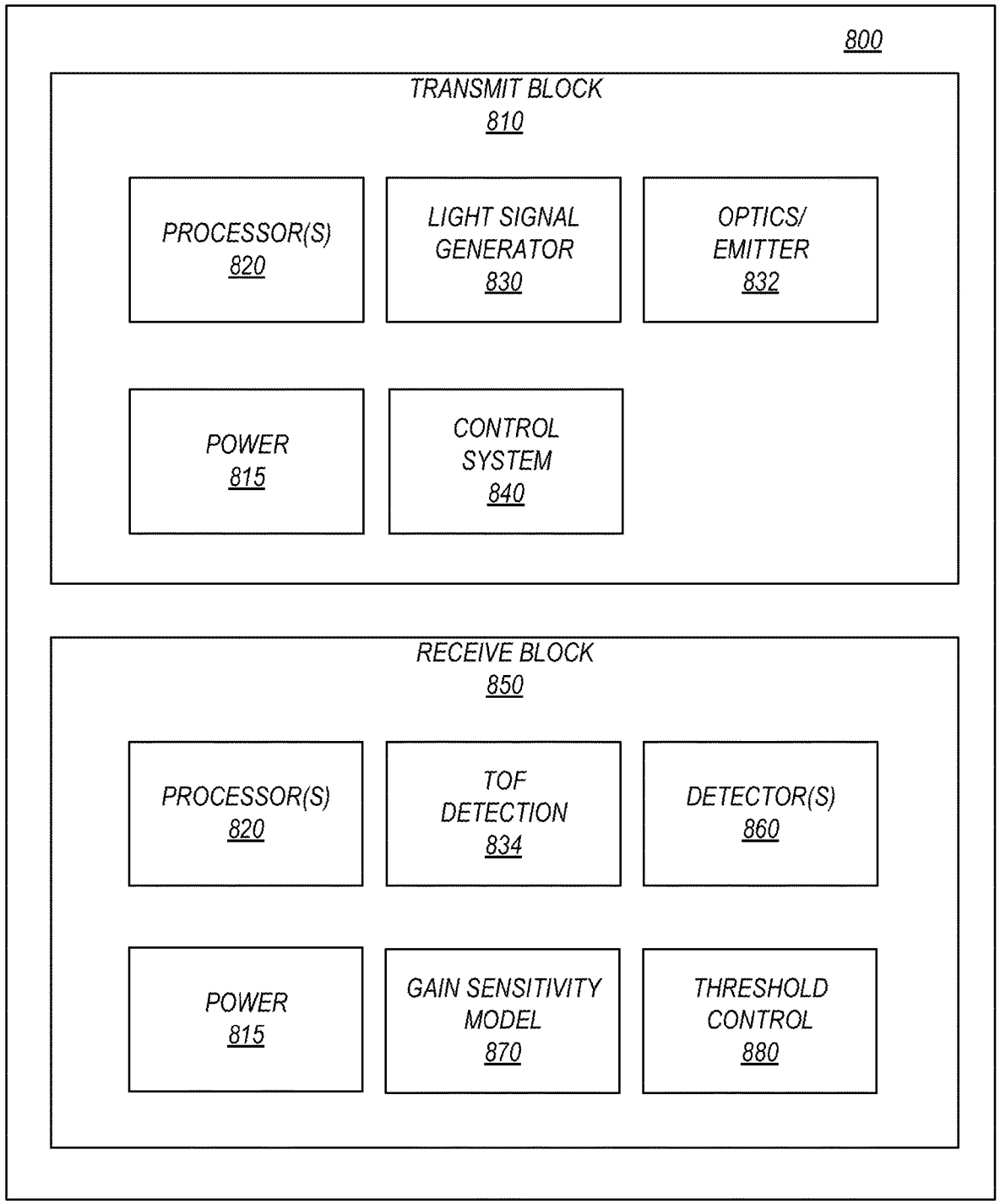
FIG. 8 illustrates a simplified block diagram showing aspects of a LiDAR-based detection system, according to certain embodiments of the invention.

FIG. 8 illustrates a simplified block diagram showing aspects of a LiDAR-based detection system 800 incorporating the feedback control function described above, according to certain embodiments. System 800 may be configured to transmit, detect, and process LiDAR signals to perform object detection as described above with regard to LiDAR system 100 described in FIG. 1. In general, a LiDAR system 800 includes one or more transmitters (e.g., transmit block 810) and one or more receivers (e.g., receive block 850). LiDAR system 800 may further include additional systems that are not shown or described to prevent obfuscation of the novel features described herein.

Transmit block 810, as described above, can incorporate a number of systems that facilitate that generation and emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 8, transmit block 810 can include processor(s) 820, light signal generator 830, optics/emitter module 832, power block 815 and control system 840. Some of all of system blocks 820-840 can be in electrical communication with processor(s) 820.

In certain embodiments, processor(s) 820 may include one or more microprocessors (µCs) and can be configured to control the operation of system 800. Alternatively or additionally, processor 820 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 800. For example, control system block 840 may include a local processor to certain control parameters (e.g., operation of the emitter). Processor(s) 820 may control some or all aspects of transmit block 810 (e.g., optics/emitter 832, control system 840, dual sided mirror 220 position as shown in FIG. 1, position sensitive device 250, etc.), receive block 850 (e.g., processor(s) 820) or any aspects of LiDAR system 800. Processor(s) 820 can also perform the functions of feedback control 414, and can determine, from a detected wavefront by wavefront sensor 412, the appropriate control signals to send to wavefront corrector 404 to correct for wavefront distortion in one embodiment. In some embodiments, multiple processors may enable increased performance characteristics in system 800 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 830 may include circuitry (e.g., a laser diode) configured to generate a light signal, which can be used as the LiDAR send signal, according to certain embodiments. In some cases, light signal generator 830 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 832 (also referred to as transmitter 832) may include one or more arrays of mirrors (including but not limited to dual sided mirror 220 as described above in FIG. 1 and the wavefront corrector micro mirror array of FIG. 5A) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 832 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 815 can be configured to generate power for transmit block 810, receive block 850, as well as manage power distribution, charging, power efficiency, and the like. In some embodiments, power management block 815 can include a battery (not shown), and a power grid within system 800 to provide power to each subsystem (e.g., control system 840, etc.). The functions provided by power management block 815 may be subsumed by other elements within transmit block 810, or may provide power to any system in LiDAR system 800. Alternatively, some embodiments may not include a dedicated power block and power may be supplied by a number of individual sources that may be independent of one another.

Control system 840 may control aspects of light signal generation (e.g., pulse shaping), optics/emitter control, TOF timing, or any other function described herein. In some cases, aspects of control system 840 may be subsumed by processor(s) 820, light signal generator 830, or any block within transmit block 810, or LiDAR system 800 in general.

Receive block 850 may include circuitry configured to detect and process a return light pulse to determine a distance of an object, and in some cases determine the dimensions of the object, the velocity and/or acceleration of the object, and the like. Processor(s) 1065 may be configured to perform operations such as processing received return pulses from detectors(s) 860, controlling the operation of TOF module 834, controlling threshold control module 880, or any other aspect of the functions of receive block 850 or LiDAR system 800 in general.

TOF module 834 may include a counter for measuring the time-of-flight of a round trip for a send and return signal. In some cases, TOF module 834 may be subsumed by other modules in LiDAR system 800, such as control system 840, optics/emitter 832, or other entity. TOF modules 834 may implement return "windows" that limit a time that LiDAR system 800 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 834 may operate independently or may be controlled by other system block, such as processor(s) 820, as described above. In some embodiments, transmit block may also include a TOF detection module. One of ordinary skill in the art with the benefit of this disclosure would appreciate the many modification, variations, and alternative ways of implementing the TOF detection block in system 800.

Detector(s) 860 may detect incoming return signals that have reflected off of one or more objects. In some cases, LiDAR system 800 may employ spectral filtering based on wavelength, polarization, and/or range to help reduce interference, filter unwanted frequencies, or other deleterious signals that may be detected. Typically, detector(s) 860 can detect an intensity of light and records data about the return signal (e.g., via coherent detection, photon counting, analog signal detection, or the like). Detector (s) 860 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 870 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 870 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 880 may set an object detection threshold for LiDAR system 800. For example, threshold control block 880 may set an object detection threshold over a certain a full range of detection for LiDAR system 800. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 800, as would be understood by one of ordinary skill in the art. For example, system 800 may include a bus system (e.g., CAMBUS) to transfer power and/or data to and from the different systems therein. In some embodiments, system 800 may include a storage subsystem (not shown). A storage subsystem can store one or more software programs to be executed by processors (e.g., in processor(s) 820). It should be understood that "software" can refer to sequences of instructions that, when executed by processing unit(s) (e.g., processors, processing devices, etc.), cause system 800 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 800 may include aspects of gain sensitivity model 870, threshold control 880, control system 840, TOF module 834, or any other aspect of LiDAR system 800.

It should be appreciated that system 800 is meant to be illustrative and that many variations and modifications are possible, as would be appreciated by one of ordinary skill in the art. System 800 can include other functions or capabilities that are not specifically described here. For example, LiDAR system 800 may include a communications block (not shown) configured to enable communication between LiDAR system 800 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 800 is described with reference to particular blocks (e.g., threshold control block 880), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 800 may be combined with or operated by other sub-systems as informed by design. For example, power management block 815 and/or threshold control block 880 may be integrated with processor(s) 820 instead of functioning as separate entities.

Example Computer Systems Implementing Aspects of Embodiments Herein

Figure 9:
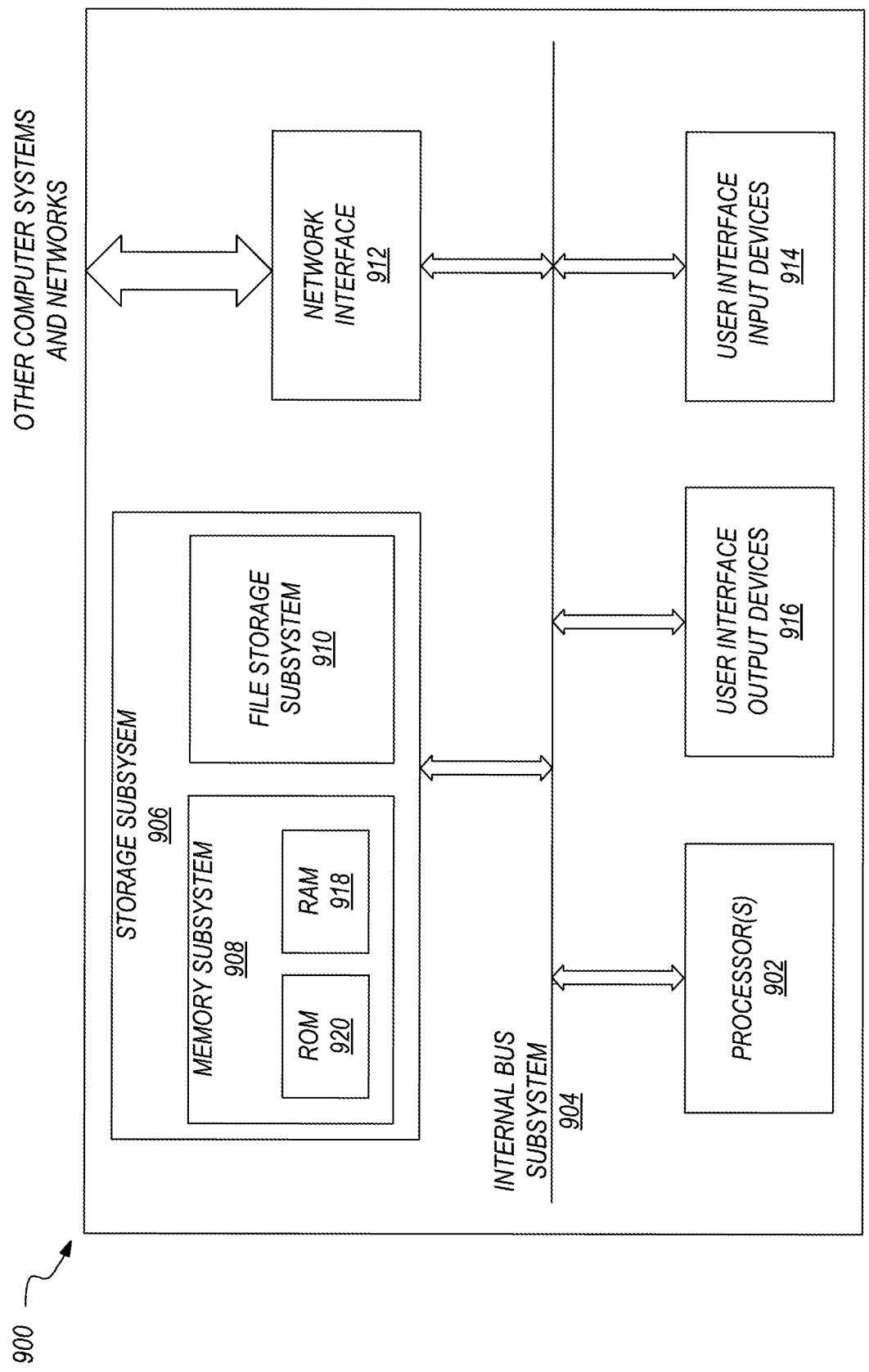
FIG. 9 illustrates an example computer system that may be utilized to implement techniques disclosed herein, according to certain embodiments of the invention.

FIG. 9 is a simplified block diagram of computer system 900 configured to operate aspects of a LiDAR-based detection system, according to certain embodiments. Computer system 900 can be used to implement any of the systems and modules discussed above with respect to FIGS. 1-7. For example, computer system 900 may operate aspects of threshold control 880, TOF module 834, processor(s) 820, control system 840, or any other element of LiDAR system 800 or other system described herein. Computer system 900 can include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computer system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. The memory system can contain a look-up table providing the wavelength corresponding to a detected temperature of the laser diode.

It should be appreciated that computer system 900 is illustrative and not intended to limit embodiments of the present disclosure. Many other configurations having more or fewer components than system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single laser to illuminate the array of MEMS mirrors, an array of lasers may be used. Also, the pattern generation and decoding could be hard-wired, in firmware or in software in different embodiments.

The MEMS-based wavefront correction feedback structure of the present invention can be used in a variety of other applications than LIDAR. For example, light beam steering techniques can also be used in other optical systems, such as optical display systems (e.g., TVs), optical sensing systems, optical imaging systems, and the like. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The MEMS mirror structure of the present invention can have the mirror mass driven by different types of actuators. In some light steering systems, the transmitted or received light beam may be steered by an array of micro-mirrors. Each micro-mirror may rotate around a pivot or connection point to deflect light incident on the micro-mirror to desired directions. The performance of the micro-mirrors may directly affect the performance of the light steering system, such as the field of view (FOV), the quality of the point cloud, and the quality of the image generated using a light steering system. For example, to increase the detection range and the FOV of a LiDAR system, micro-mirrors with large rotation angles and large apertures may be used, which may cause an increase in the maximum displacement and the moment of inertia of the micro-mirrors. To achieve a high resolution, a device with a high resonant frequency may be used, which may be achieved using a rotating structure with a high stiffness. It may be difficult to achieve this desired performance using electrostatic actuated micro-mirrors because comb fingers used in an electrostatic-actuated micro-mirror may not be able to provide the force and moment needed and may disengage at large rotation angles, in particular, when the aperture of the micro-mirror is increased to improve the detection range. Some piezoelectric actuators may be used to achieve large displacements and large scanning angles due to their ability to provide a substantially larger drive force than electrostatic-actuated types, with a relatively lower voltage.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. An optical micro-electromechanical system (MEMS) system for detecting an incoming laser beam, comprising:
   a photodetector;
   a beam splitter mounted to direct most of the incoming laser beam to the photodetector, and to divert a portion of the incoming laser beam;
   a wavefront sensor mounted to receive the portion of the incoming laser beam diverted by the beam splitter, the wavefront sensor having an array of pixels, each pixel having an array of photodetectors;
   a wavefront corrector, mounted to direct the incoming laser beam to the beam splitter, the wavefront corrector having an array of MEMS micro mirrors corresponding to the array of pixels;
   a feedback control circuit, coupled between the wavefront sensor and the wavefront corrector, configured to control the wavefront corrector to at least partially correct for wavefront distortions detected by the wavefront sensor by tilting individual micro mirrors to correct for a position in a corresponding pixel of a photodetector which detects the incoming laser beam; and
   wherein the array of pixels comprises at least 100,000 pixels, the array of photodetectors for each pixel comprises at least 9 photodetectors, and the array of MEMS micro mirrors comprises at least 100,000 micro mirrors.

2. The optical MEMS system of claim 1, wherein the array of pixels comprises at least one million pixels, and the array of MEMS micro mirrors comprises at least one million micro mirrors.

3. The optical MEMS system of claim 1, wherein each micro mirror is an electrostatic force micro mirror that comprises:
   a mirror body; and
   first and second electrodes below the mirror body.

4. The optical MEMS system of claim 3, wherein each micro mirror further comprises a pair of anchors at diagonal corners, and a spring connecting each anchor to the mirror body, enabling one directional wavefront correction along a first axis.

5. The optical MEMS system of claim 3, wherein each micro mirror tilts along two axes to enable two directional wavefront correction along a first and a second axis.

6. An apparatus for detecting an incoming laser beam, comprising:
   a photodetector;
   a beam splitter mounted to direct most of the incoming laser beam to the photodetector, and to divert a portion of the incoming laser beam;
   a wavefront sensor mounted to receive the portion of the incoming laser beam diverted by the beam splitter;

a wavefront corrector, mounted to direct the incoming laser beam to the beam splitter;

a feedback control circuit, coupled between the wavefront sensor and the wavefront corrector, configured to control the wavefront corrector to at least partially correct for wavefront distortions detected by the wavefront sensor;

wherein the wavefront sensor has an array of pixels, and the wavefront corrector has an array of MEMS micro mirrors corresponding to the array of pixels;

wherein each pixel has an array of photodetectors; and wherein the array of pixels comprises at least 100,000 pixels, the array of photodetectors for each pixel comprises at least 9 photodetectors, and the array of MEMS micro mirrors comprises at least 100,000 micro mirrors.

7. The apparatus of claim 6, wherein each micro mirror is an electrostatic force micro mirror that comprises:
a mirror body; and
first and second electrodes below the mirror body.

8. The apparatus of claim 7, wherein each micro mirror further comprises a pair of anchors at diagonal corners, and a spring connecting each anchor to the mirror body, enabling one directional wavefront correction along a first axis.

9. The apparatus of claim 7, wherein each mirror tilts along two axes to enable two directional wavefront correction along a first and a second axis.

10. The apparatus of claim 7 wherein the first and second electrodes are connected to first and second control voltage sources, and the mirror body is connected to ground.

11. The apparatus of claim 6, wherein the beam splitter diverts less than five percent of the incoming laser beam as the portion of the incoming laser beam.

12. A method for detecting an incoming laser beam, comprising:
detecting most of the incoming laser beam with a photodetector;
directing most of the incoming laser beam to the photodetector, and diverting a portion of the incoming laser beam;
receiving the diverted portion of the incoming laser beam at a wavefront sensor;
detecting wavefront distortions of the incoming laser beam with the wavefront sensor;
modifying the incoming laser beam to at least partially correct for the wavefront distortions detected by the wavefront sensor;
detecting the wavefront distortions with an array of pixels;
modifying the incoming laser beam by tilting the incoming laser beam differently at different pixel positions;
comprising tilting the incoming laser beam at different pixel positions with a micro-electromechanical system (MEMS) mirror at each pixel position; and
wherein the tilting is performed by an array of at least 100,000 MEMS mirrors, the detecting is performed by an array of at least 100,000 photodetector pixels, with each photodetector pixel comprising at least 9 photodetectors.

13. The method of claim 12 wherein the tilting comprises using electrostatic force to tilt the MEMS mirror.

* * * * *